Nov. 4, 1969   J. W. KINNAVY   3,476,287
TRIPLETITE FRICTION CLOSURES
Original Filed Dec. 9, 1964   2 Sheets-Sheet 1
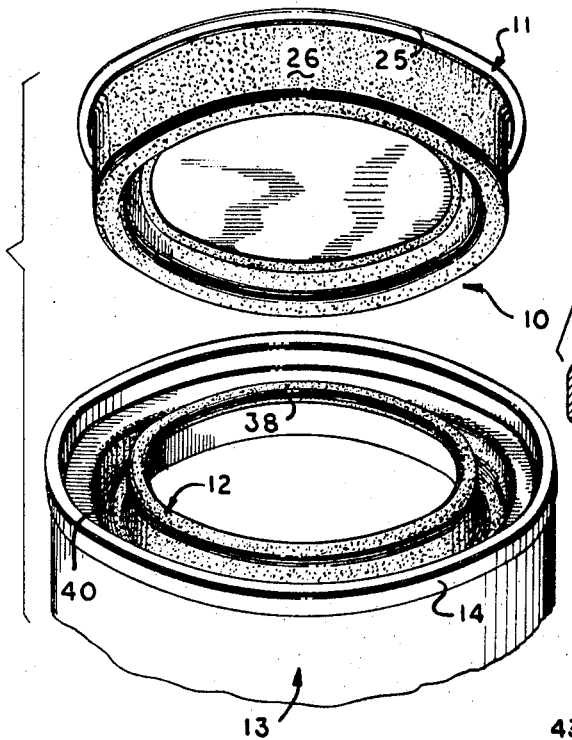
FIG. 1
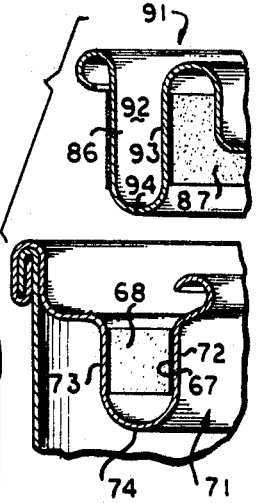
FIG. 8
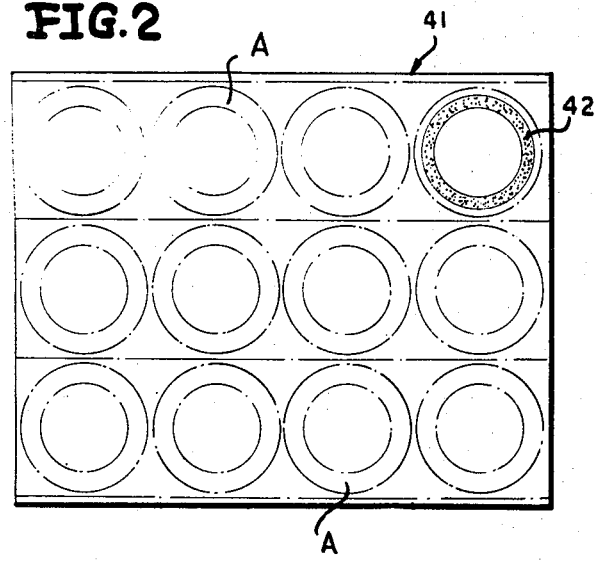
FIG. 2
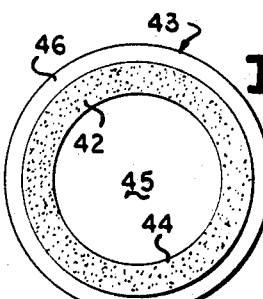
FIG. 3
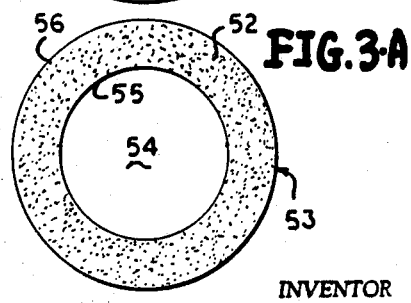
FIG. 3-A
INVENTOR
JAMES W. KINNAVY
ATTORNEYS Nov. 4, 1969   J. W. KINNAVY   3,476,287
TRIPLETITE FRICTION CLOSURES
Original Filed Dec. 9, 1964   2 Sheets-Sheet 2
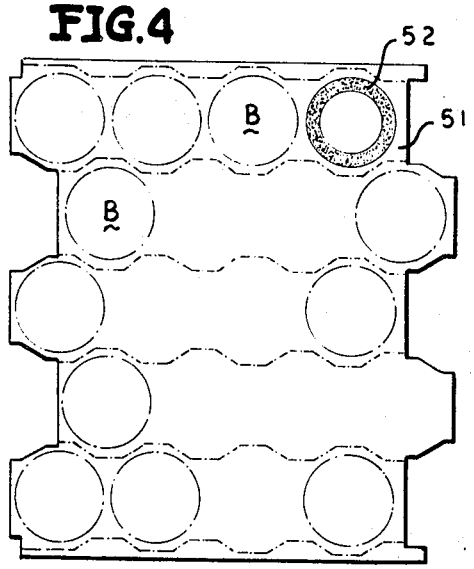
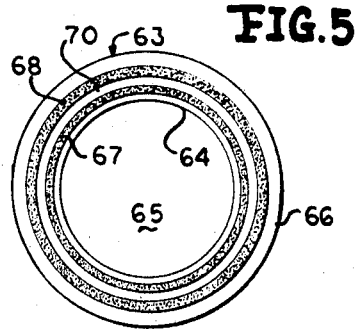
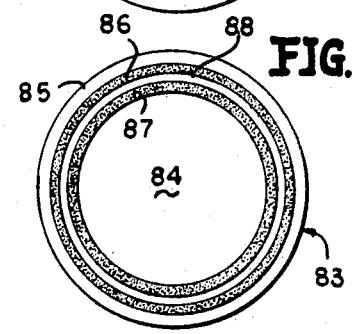
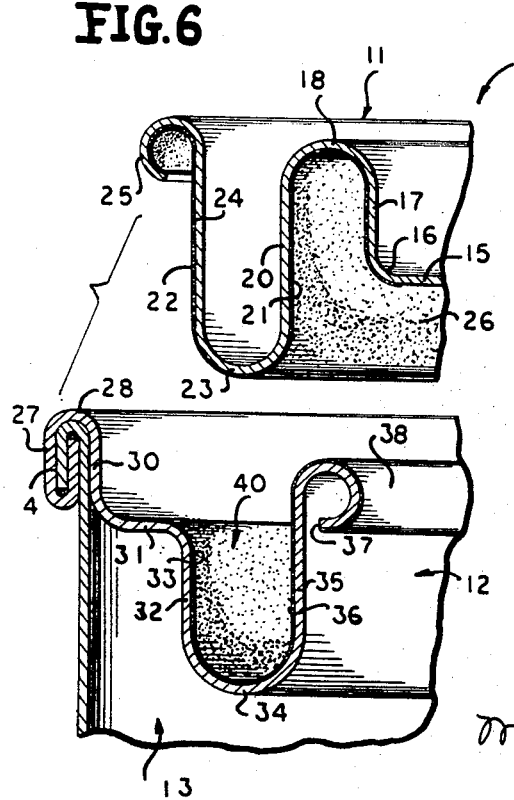
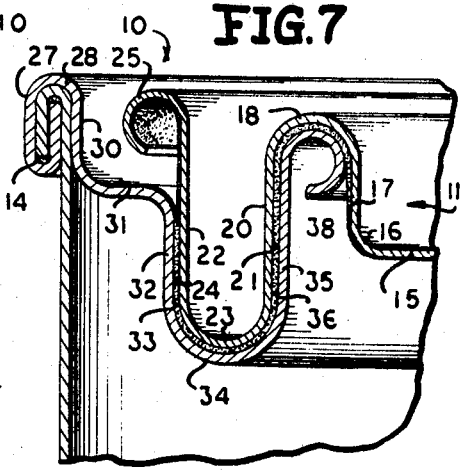
INVENTOR
JAMES W. KINNAVY
ATTORNEYS

United States Patent Office 3,476,287
Patented Nov. 4, 1969

3,476,287
TRIPLETITE FRICTION CLOSURES
James W. Kinnavy, Westmont, Ill., assignor to Continental Can Company, Inc., New York, N.Y., a corporation of New York
Original application Dec. 9, 1964, Ser. No. 416,986. Divided and this application Jan. 7, 1969, Ser. No. 789,448
Int. Cl. B65d 41/28, 53/02
U.S. Cl. 220—42                                    7 Claims

ABSTRACT OF THE DISCLOSURE

This disclosure relates to tripletite friction closures of the type formed of an annular ring and a circular plug, said ring and plug each being formed of a generally U-shaped cross section defined by opposed friction walls joined by an integral panel, and one or both of the friction walls is provided with a coating of organosol material to form a hermetic seal therebetween.

---

This application is a division of my co-pending commonly assigned application Ser. No. 416,986, filed Dec. 9, 1964.

This invention is directed to novel friction closures of the tripletite type formed of a ring and a plug of metallic sheet material which is selectively spot coated at predetermined areas with an organosol coating after which the predetermined areas are removed and formed into rings and/or plugs of the friction closures.

Tripletite friction closures are best known for their association with containers in which is packaged oil or water base paints. Over the years the paint skinning of oil base paints has presented an ever-increasing problem to the paint manufacturing industry primarily because the friction closures associated with conventional paint containers did not effectively seal the interior of the containers to atmosphere and the air leaking into such containers produced excessive skinning of the paint. This disadvantage was overcome to some extent by the use of conventionally known sealing compounds which are not only partially effective, but which are also relatively expensive.

Friction closures of the type including plugs and rings which are coated with conventional compound material also have a tendenrcy to "pop" under the influence of pressure build-up in the containers with which the closures are associated. This tendency of conventional tripletite closures to pop is increased to some extent by the conventional compound applied thereto which, while maintaining a relatively gas-tight seal, reduces the friction forces tending to retain the plugs and rings of the closures in assembled condition.

In accordance with this invention, it is a primary object to substantially eliminate disadvantages heretofore associated with tripletite friction closures, and in particular, to render such closures relatively leak-proof and increase the frictional forces retaining the plugs and rings in assembled relationship by coating friction walls of the rings, plugs or both with an organosol coating whereupon the assembly of the tripletite closures causes the organosol to flow or stretch and conform to the configuration of the plug and ring friction walls and fill in any highs and lows of these walls resulting in a tight seal and an increase in the friction forces to effect greater sealing efficiency and substantially reduce excessive conventional plug "popping" of such closures.

A further object of this invention is to provide novel friction closures of the type aforesaid wherein the plugs and rings are each defined by generally U-shaped opposing friction walls, and a coating of organosol material is applied only to the friction walls and not to annular integral panels therebetween.

With the above and other objects in view that will hereinafter appear, the nature of the invention will be more clearly understood by reference to the following detailed description, the appended claims and the several views illustrated in the accompanying drawings:

In the drawings:

FIGURE 1 is an exploded perspective view of a tripletite friction closure constructed in accordance with this invention, and illustrates a ring thereof secured to a container, a plug positioned prior to friction fitment with the ring, and an organosol coating the friction walls of the ring and plug.

FIGURE 2 is a top plan view of a metallic sheet from which the ring and/or plug of FIGURE 1 is constructed and illustrates in phantom outline a plurality of predetermined areas selectively spot coated with an organosol.

FIGURE 3 is a top plan view of a ring blank after being removed from the sheet of FIGURE 2, and illustrates a generally annular area of coating.

FIGURE 3–A is a top plan view of a plug blank formed from a metallic sheet shown in FIGURE 4, and illustrates a generally annular area of coating.

FIGURE 4 is a top plan view of a metallic sheet similar to the sheet of FIGURE 2, and illustrates in phantom outline a plurality of areas which are selectively spot coated with an organosol and removed to form the plug of FIGURE 3–A.

FIGURE 5 is a top plan view of a ring blank similar to the ring blank of FIGURE 3, but illustrates a pair of annular concentric organosol coated areas.

FIGURE 5–A is a top plan view of a plug blank similar to the plug blank of FIGURE 3–A, but illustrates a pair of concentric spaced annular coating areas.

FIGURE 6 is an enlarged fragmentary vertical sectional view of the container and friction closure of FIGURE 1, and illustrates the plug positioned above the ring prior to assembly with the ring and the organosol coated areas of the ring and plug.

FIGURE 7 is a fragmentary vertical sectional view similar to FIGURE 6, and illustrates the plug in friction engagement with the ring of the tripletite closure.

FIGURE 8 is an exploded fragmentary vertical sectional view of a friction closure of the type shown in FIGURE 6, and illustrates the further selective coating of the friction walls of a plug and ring formed from the respective plug and ring blanks of FIGURES 5–A and 5.

Referring in particular to the drawings, a novel tripletite friction closure constructed in accordance with this invention is best illustrated in FIGURES 1, 6 and 7 of the drawings, and is generally referred to by the reference numeral 10. The tripletite friction closure 10 is of a two part construction comprising a plug or plug portion 11 and a ring or ring portion 12, the latter being secured to a container 13 by a double seam 14 (FIGURES 6 and 7).

The plug 11 of the friction closure 10 includes a recessed center panel 15 joined by a radius portion 16 to an annular wall 17. The annular wall 17 is joined by an integral radius portion 18 to a friction wall 20. The friction wall 20 is conventionally referred to as a B friction wall and includes a friction surface 21. The friction wall 20 is joined to an A friction wall 22 by a plug seat panel 23. The friction walls 20 and 22 are generally in parallel relationship, and the friction wall 22 includes a friction surface 24 facing in a direction opposite to the friction surface 21 of the friction wall 20. The friction wall 22 terminates in an outwardly, downwardly and inwardly turned plug curl 25.

Prior to the formation of the plug 11 in a manner to be described more fully hereafter, a major portion of the plug 11 is provided with an organosol coating 26 which extends from an edge (unnumbered) of the curl 25 to the center panel 15 terminating substantially at the point of merger between the center panel 15 and the radius portion 16. The organosol coating material 26 is preferably a resin composition comprising a vinyl copolymer in a plasticizer and including a solvent which permits the application of a relatively thin coating of material to the plug 11. Such organosols are known primarily for their use as corrosion-resisting agents, but to the inventor's knowledge are unknown as closure sealants and friction increasing agents. While no preferred composition of the coating 26 is disclosed herein, compositions of the type disclosed at pages 553 through 560 of Rubber Age, volume 67, No. 5, August 1955 may be employed in the practice of this invention.

The ring 12 of the tripletite friction closure 10 includes a seam panel 27 forming a portion of the double seam 14, in the manner best illustrated in FIGURES 6 and 7 of the drawings. The seam panel 27 is joined by a radius portion 28 to a generally annular chuck wall 30. The chuck wall 30 is joined by a generally annular radially inwardly directed shoulder 31 to an A friction wall 32 having a friction surface 33. The friction wall 32 is joined by a ring seat panel 34 to a B friction wall 35 having a friction surface 36 opposing the friction surface 33 of the friction wall 32. The friction walls 32 and 35 are generally parallel to each other and define with the ring seat panel 34 a generally U-shaped channel (unnumbered) into which is received a complementary generally U-shaped portion (unnumbered) of the plug 11 defined by the walls 20, 22, 23, in a manner clearly illustrated in FIGURE 7 of the drawings. The friction wall 35 is integrally joined by a radius portion 37 to an inwardly, downwardly and outwardly turned curl 38.

A coating of organosol, generally referred to by the reference numeral 40, is applied to the ring 12 in a manner to be described more fully hereafter, and extends between the edge of the curl 38 to the annular shoulder 31. The coating 40 is similar in composition to the coating 26 of the plug 11, and a further description thereof is considered unnecessary for a complete understanding of this invention.

The plug 11 and the ring 12 are formed in substantially an identical manner, and the following description of the formation of the ring 12 will be sufficient for an understanding of the formation of the plug 11. The ring 12 is formed from a sheet 41 (FIGURE 2) of relatively thin metallic material, such as tinplate. The sheet 41 is conveyed by driven rolls (not shown) or similar conventional conveying means beneath a coating cylinder (also not shown). The coating cylinder includes a peripheral surface having a plurality of raised annular ring-like portions corresponding in shape and size to the predetermined areas A of the sheet 41 which are to be coated with organosol. The organosol coating material is applied to the ring-like portions of the coating cylinder in a conventional manner and is transferred therefrom to the sheet 41 as the same passes beneath the coating cylinder at a speed substantially equal to the peripheral speed of the cylinder. This synchronism in speed between the periphery of the coating cylinder and the sheet 41 assures that each of the predetermined areas A are coated with a generally annular coating 42 without marring.

The sheet 41 is thereafter preferably heated to drive off the solvents of the coating composition, and each area A is removed from the sheet 41 by a stamping operation to form a plurality of ring blanks, each corresponding to a ring blank 43 of FIGURE 3.

The ring blank 43 includes a radially innermost circular edge 44 defining a generally circular opening 45. The innermost edge 44 and a generally circular outermost edge 46 define the generally annular shape of the ring blank 43. The coating 42 is similarly annular and extends from the innermost edge 44 to a point slightly beyond the medial distance between the edges 44 and 46.

The ring blank 43 is then conventionally drawn to the configuration of the ring 12 of FIGURE 6 with the exception that the seam panel 27 is not yet fully formed as shown in FIGURE 6 to form the double seam 14. In the final form of the ring 12, the coating 40 corresponds to the annular area of the coating 42 of FIGURE 3, and as noted heretofore, extends between the edge of the curl 38 and the annular shoulder 31.

The plug 11 of the tripletite friction closure 10 is formed in a manner substantially identical to the formation of the ring 12. As is best illustrated in FIGURE 4, a sheet 51 of tinplate or like metal is conveyed by rolls (not shown) or similar conventional conveying devices beneath a coating cylinder (also not shown) similar to the coating cylinder heretofore described but including generally annular portions projecting outwardly from the periphery thereof. The projecting annular portions are, as distinguished from the portions of the coating cylinder associated with the printing of the sheet 41 of FIGURE 2, staggered in the manner shown by the predetermined areas B of FIGURE 4. Thus, as the sheet 51 is conveyed beneath the coating cylinder, the organosol deposited upon the annular portions of the cylinders in a conventional manner is transferred in a staggered relationship to each of the areas B in a generally annular pattern 52.

Thereafter, each of the areas B are removed from the sheet 51 by a striking operation to form a plurality of plug blanks, one such plug blank being illustrated in FIGURE 3-A and referred to by the reference numeral 53. The plug blank 53 includes a central panel 54 defined by a radially innermost circular edge 55 of the coating 52. The coating 52 extends between the innermost edge 55 thereof and an outermost edge 56 of the blank 53.

The blank 53 is thereafter formed to the configuration of the plug 11 of FIGURES 6 and 7 of the drawings, with the coating 52 of FIGURE 3-A corresponding to the coating 26 of FIGURE 6.

After the ring 12 has been secured by the double seam 14 to the container 13, and the container 13 is packaged with material, such as an oil base paint, the plug 11 is force-fit upon the ring 12 in the manner illustrated in FIGURE 7 of the drawings. During this force-fitting of the plug 11 and ring 12, the organosol coatings 26, 40 along the opposed friction walls 22, 32 and 20, 35 flow and stretch filling in any high or low spots in the respective surfaces 24, 33 and 21, 36. This effect of the organosol coatings 26, 40 not only insures a hermetic seal which is augmented by the seating of the radius portion 18 of the plug 11 upon the curl 38 of the ring 12, but also increases the friction forces retaining these elements in assembled relationship.

Tripletite friction closure of the type illustrated in FIGURES 6 and 7 of the drawings have been formed in the manner described and tested to determine the sealing efficiency thereof relative to similar friction closures which were either uncoated or were coated with conventional sealing compounds. Hereafter is listed the test variables in descending order of sealing efficiency as determined by the percentage of oxygen in a contained at intervals of time after initial nitrogen packing.

EXAMPLE A

| Plug Coating | Initial, percent | 3 days, percent | 10 days, percent |
|---|---|---|---|
| (1) Conventional Compound (MK-25) | <0.1 | <0.1 | <0.1 |
| (2) Organosol Coating A ((159 (20) 158 (3.5)) | <0.1 | 0.2 | 0.2 |
| (3) Organosol Coating B [1] ((159 (10.0) 158 (3.5)) | <0.1 | 0.3 | 1.7 |
| (4) Organosol Coating B [2] ((159 (10.0) 158 (3.5))) | <0.1 | 0.3 | 2.4 |
| (5) (a) Uncoated | <0.1 | 1.2 | 3.9 |
| (b) Uncoated | 0.5 | 6.5 | 12.0 |
| (c) Uncoated | 0.6 | 6.0 | 12 |

[1] Coating applied to both ring and plug friction walls.
[2] Coating applied to ring friction walls only.

It is readily observable from the foregoing listing of the leakage tests results of various tripletite friction closures that the use of an organosol coating applied to plugs and/or rings greatly increases the sealing efficiency of containers with which the closures are associated. The organosol coated closures do not perform with the efficiency of conventional compound lined closures, but approach comparable sealing characteristics when a film weight of 20 mgs./in.$^2$ are employed (result 2). However, the relative cost between compound lined plugs and organosol coating plugs far outweighs the slight disadvantage in sealing efficiency between the same. With respect to the uncoated closures (result 5), relatively little comparison between the sealing efficiencies of these latter friction closures and organosol coated closures can be noted. The primary significance of the test results heretofore listed is the significant sealing of a heavy coating of organosol (result 2) as compared to a more expensive conventional compound coating (result 1).

While the described method and tripletite closure 10 effect substantial savings from the standpoint of both the cheaper cost of the organosol material and the selective application thereof to the blanks 43 and 53, still further savings and an equally efficient tripletite friction closure can be formed by spot coating blanks as shown in FIGURES 5 and 5–A of the drawings by the method heretofore described in the consideration of FIGURES 2 and 4.

Referring in particular to FIGURE 5 of the drawings, a ring blank 63, corresponding to the ring blank 43 of FIGURE 3, includes an innermost edge 64 defining a circular opening 65. The innermost edge 64 and an outermost edge 66 define the generally annular shape of the ring blank 63. In lieu of the single annular area of coating 42 of FIGURE 3, the ring blank 63 is provided with a pair of concentric areas 67, 68 coated with an organosol and spaced by an area 70 which is free of coating material. The ring blank 63 is formed into a ring 71 of FIGURE 8 in the manner heretofore described with the areas 67 and 68 corresponding to respective friction walls 72, 73 and the uncoated area 70 corresponding to a radius portion 74 integrally joining the friction walls 72, 73. In this manner, the organosol coated areas 67, 68 are confined and limited to the friction walls 72, 73 respectively, resulting in efficient sealing at a reduction in sealing material.

A plug blank 83 of FIGURE 5–A is similarly of a circular configuration and includes a central panel 84 and an outermost circular edge 85. A pair of annular areas 86, 87 are coated with an organosol and are spaced by an uncoated area 88. Upon the formation of the plug blank 83 into a plug 91 of FIGURE 8, the coated areas 86, 87 are limited to the friction surfaces (unnumbered) of friction walls 92, 93 respectively. The friction walls 92, 93 are joined by an integral radius portion 94 corresponding to the uncoated area 88 of the plug blank 83. Thus, an additional savings in material is effected by this selective application of the coating material to the friction walls 92, 93 with no appreciable difference in the sealing efficiency thereof as compared to either conventional friction closures or the friction closure 10 heretofore described.

From the foregoing, it will be seen that novel and advantageous provision has been made for carrying out the desired end. However, attention is directed to the fact that variations may be made in the disclosed tripletite friction closures, as well as the plug and ring blanks thereof, without departing from the spirit and scope of this disclosure.

I claim:

1. A two-piece closure for use with a container to effect a hermetic sealing thereof comprising a ring portion and a plug portion, said ring and plug portions including opposed friction walls adapted for frictional engagement upon the assembly of said ring and plug portions, and a coating of an organosol material on the surface of at least one of said opposed friction walls whereby a container to which the portions are joined is hermetically sealed.

2. The two-piece closure as defined in claim 1 wherein the coating of the organosol material is disposed on the surface of only both of said opposed friction walls.

3. The two-piece closure as defined in claim 1 wherein said ring and plug portions are each of a generally U-shaped cross section with the friction walls of each being joined by an integral panel, and one of said friction walls of said ring portion terminates in an inwardly downwardly and outwardly turned curl.

4. An article of manufacture comprising an annular metallic sheet member, and a pair of concentric radially spaced coatings of an organosol material applied to a surface thereof.

5. A two-piece closure comprising a generally annular ring and a circular plug, said ring including radially outermost, innermost and central portions, said plug including radially outermost, innermost and central portions, said plug outermost portion and ring innermost portion terminating in respective curls, each of said central portions being generally U-shaped in cross section, said U-shaped central portion of said ring being defined by opposed friction surfaces joined by an integral annular panel, said U-shaped central portion of said plug being defined by oppositely facing friction surfaces joined by an integral annular panel, and a coating of an organosol material at least covering the friction surfaces of at least one of said ring and plug friction surfaces.

6. The two-piece closure as defined in claim 5 wherein the coating of organosol material covers only the friction surfaces of both the ring and plug central portions and not the annular integral panels therebetween.

7. The two-piece closure as defined in claim 6 wherein said plug outermost portion and ring innermost portion terminate in respective curls, and the curl of said ring being inwardly, upwardly and outwardly turned.

References Cited
UNITED STATES PATENTS

| | | | |
|---|---|---|---|
| 3,338,456 | 8/1967 | Kinnavy et al. | 220—42 |
| 1,847,245 | 3/1932 | Hothersall | 220—42 |

GEORGE T. HALL, Primary Examiner

U.S. Cl. X.R.

220—46